United States Patent
Li et al.

(10) Patent No.: US 12,325,287 B2
(45) Date of Patent: Jun. 10, 2025

(54) VEHICLE, METHOD AND SYSTEM FOR DRYING EVAPORATOR OF VEHICLE AIR CONDITIONER, AND STORAGE MEDIUM

(71) Applicant: NIO TECHNOLOGY (ANHUI) CO., LTD, Hefei (CN)

(72) Inventors: Chunhai Li, Shanghai (CN); Ruipo Zhao, Shanghai (CN); Fang Han, Shanghai (CN); Jiachen Zhang, Shanghai (CN); Jie Gao, Shanghai (CN)

(73) Assignee: NIO TECHNOLOGY (ANHUI) CO., LTD, Hefei (CN)

( * ) Notice: Subject to any disclaimer, the term of this patent is extended or adjusted under 35 U.S.C. 154(b) by 112 days.

(21) Appl. No.: 18/183,718

(22) Filed: Mar. 14, 2023

(65) Prior Publication Data

US 2023/0294488 A1   Sep. 21, 2023

(30) Foreign Application Priority Data

Mar. 17, 2022  (CN) .......................... 202210267663.4

(51) Int. Cl.
*B60H 1/32*    (2006.01)

(52) U.S. Cl.
CPC ... *B60H 1/3233* (2013.01); *B60H 2001/3282* (2013.01); *B60H 2001/3288* (2013.01)

(58) Field of Classification Search
CPC ............. B60H 1/3233; B60H 1/00592; B60H 1/3202; B60H 1/00849; B60H 2001/3282; B60H 2001/3288; B60H 3/0085; B60H 2001/00178; B60H 2001/3245; F25B 39/02; F26B 21/001; F26B 21/08; F28F 17/005
See application file for complete search history.

(56) References Cited

FOREIGN PATENT DOCUMENTS

| CN | 207972503 | U | * | 10/2018 | |
|---|---|---|---|---|---|
| CN | 111873748 | A | * | 11/2020 | ......... B60H 1/00642 |
| DE | 102006007322 | A1 | * | 8/2007 | ......... B60H 1/00035 |
| EP | 1350645 | A2 | * | 10/2003 | ......... B60H 1/00057 |

* cited by examiner

*Primary Examiner* — Emmanuel E Duke
(74) *Attorney, Agent, or Firm* — Sheridan Ross P.C.

(57) ABSTRACT

A method for drying an evaporator of a vehicle air conditioner comprises closing an air duct after cooling of the vehicle air conditioner is stopped, operating the heating core and the fan, so as to generate, by means of the heating core and the fan, hot air which can circulate in the air duct. During circulation, the hot air carries away condensed water precipitated on a surface of the evaporator core for conversion into hot and humid air. The method includes directly venting the hot and humid air from the air duct to exterior environment, so that the evaporator core is dried. The method can implement the drying of the evaporator with high-efficiency and low energy consumption.

13 Claims, 3 Drawing Sheets

VEHICLE, METHOD AND SYSTEM FOR DRYING EVAPORATOR OF VEHICLE AIR CONDITIONER, AND STORAGE MEDIUM

CROSS-REFERENCE TO RELATED APPLICATIONS

This application claims the benefit of China Patent Application No. 202210267663.4 filed Mar. 17, 2022, the entire contents of which are incorporated herein by reference in its entirety.

TECHNICAL FIELD

The disclosure relates to the technical field of vehicles, and particularly provides a vehicle, a method and system for drying an evaporator of a vehicle air conditioner, and a storage medium.

BACKGROUND

A vehicle air conditioner is an important device that can improve the comfort of interior environment, especially in hot summer. Using the vehicle air conditioner can keep the air quality in a vehicle cabin at a better level.

During cooling of the vehicle air conditioner, an evaporator arranged inside an air conditioner box will produce a large amount of condensed water, and the condensed water will be drained to external environment through a condensed water outlet arranged below the evaporator. When the cooling of the vehicle air conditioner is finished, part of the condensed water will adhere to a surface of an evaporator core to form a water film, to absorb dust, bacteria, etc. in an air duct. In addition, the temperature is higher in summer and hot and humid environment promotes molds to grow, and mold metabolism produces a peculiar smell. After the vehicle air conditioner is turned on again, the peculiar smell in the air duct enters the vehicle cabin with an air flow, thereby reducing the air quality in the vehicle cabin, causing discomfort to a user, and impairing the health of the user.

Therefore, how to prevent the generation of a peculiar smell has become an urgent problem to be solved for existing vehicle manufacturers. As an improvement, a patent application with the publication No. CN 111873748 A provides a method for keeping an evaporator of a vehicle air conditioner dry. Specifically, after a vehicle is shut down, a mixing damper driver is set to a highest heat level, so that the air conditioner enters an internal circulation mode, and an air outlet mode is adjusted to a foot blowing mode. In this way, the mixing damper is driven to a hottest position, the air conditioner is set in the internal circulation mode, and the air outlet mode is set in the foot blowing mode, so that residual heat from a heating core rapidly flows back to the evaporator, thereby accelerating evaporation of the water on a surface of the evaporator and drying the evaporator. Although this solution can facilitate the drying of the evaporator, the air outlet mode needs to be set in the foot blowing mode during drying, and hot air is discharged into a vehicle cabin during air circulation, which rapidly raises the temperature in the vehicle cabin, reduces the air quality, and causes discomfort of a user as well as makes the user doubt about whether the user can successfully shut down the air conditioner, resulting in poor user experience.

A patent application with the publication No. CN 107521303 A provides a method for preventing a vehicle from being moldy and preventing a mold smell. Specifically, when a vehicle cabin is unoccupied, a motor of a fan in an air duct is reversely operated to discharge an airflow flowing through an evaporator to the outside of a passenger cabin, and a heater is used to heat the airflow flowing through the evaporator, so as to assist in drying the evaporator and prevent the growth of molds. However, this solution is applicable to very limited scenarios, and is applicable only in absence of a passenger or driver in the vehicle cabin. Moreover, drying efficiency of the evaporator is not high, and the user experience is also poor.

BRIEF SUMMARY

The disclosure aims to solve or at least alleviate the above technical problems, i.e., to solve or alleviate the problems of low efficiency and poor effects of an existing method for drying an evaporator of a vehicle air conditioner.

According to a first aspect, the disclosure provides a method for drying an evaporator of a vehicle air conditioner, wherein the vehicle air conditioner comprises an air conditioner box, the evaporator comprises an evaporator core, an air duct for circulating air is constructed in the air conditioner box, and a fan, the evaporator core and a heating core are arranged in the air duct, the method comprising: closing the air duct after cooling of the vehicle air conditioner is stopped; operating the heating core and the fan such that: hot air capable of circulating is generated in the air duct by means of the heating core and the fan, and during circulation, the hot air carries away condensed water precipitated on a surface of the evaporator core for conversion into hot and humid air; and directly venting the hot and humid air from the air duct to exterior environment, so that the evaporator core is dried.

In the method for drying an evaporator of a vehicle air conditioner provided according to the disclosure, after cooling of the vehicle air conditioner is stopped, the air duct is closed, and then the fan and heating core are operated, so that the fan is used to force the air in the air duct to circulate, and the heating core is used to raise the temperature of the circulating air. In this way, the circulating hot air is constantly blown to the evaporator core to accelerate the evaporation of residual water on the surface of the evaporator core. In this process, heat emitted by the heating core can be fully utilized because the air duct is closed, so that the temperature of the air in the air duct continuously rises, thereby accelerating the water evaporation, implementing rapid drying of the evaporator core, and increasing the drying efficiency of the evaporator. In addition, during drying, because the air duct is closed, the generated hot air will not enter interior environment, thereby avoiding affecting the interior environment, keeping the comfort of the interior environment, and causing no trouble to a user. When the water on the surface of the evaporator core is dried, the hot and humid air is directly vented to the exterior environment from the air duct. Due to the limited volume of the hot and humid air in the air duct, the venting efficiency of the hot and humid air is very high. As such, a very high efficiency can be achieved in both a drying stage and a moisture discharge stage during drying, so that the efficiency of the whole drying process of the evaporator is increased. In addition, emitted heat energy can be fully utilized, system energy consumption is reduced, and the evaporator is dried with a high-efficiency low energy consumption.

It can be understood that the air duct may be an additionally provided air duct special for drying the evaporator, or may be a reuse of an existing cold air/warm air duct. When the existing cold air/warm air duct is reused as a drying air duct, the sealing and opening of the air duct can be implemented by controlling each original damper for the cold air/warm air duct.

In addition, the venting of the hot and humid air in the air duct may be venting of all hot and humid air. This process requires complete replacement of the hot and humid air with the air in the exterior environment. The replacement process can be facilitated by the operation of the fan. The venting may alternatively be venting of most of the hot and humid air. This process does not require the provision of power required for air replacement, and most of the hot and humid air can be vented only by means of the difference between pressures inside and outside the air duct. Although a very small part of the hot and humid air may retain in the air duct after balancing of the difference between internal and external pressures, the impact on the environment in the air duct can be ignored due to the very small volume of this part of the hot and humid air. The solution by means of the pressure difference is more energy-efficient than the solution of complete replacement.

It should be noted that "direct venting" in the disclosure means that the hot and humid air directly enters the exterior environment from the air duct without passing through the interior environment, but the venting process of the hot and humid air may be direct venting by opening the damper, or direct venting through an existing pipeline such as a condensed water pipe.

In some feasible implementations of the above method for drying an evaporator of a vehicle air conditioner, the air duct is provided with a ventilation section, the ventilation section comprises a first ventilation section and a second ventilation section, the first ventilation section is capable of being in communication with the interior environment, the second ventilation section is capable of being in communication with the exterior environment, and closing the air duct after cooling of the vehicle air conditioner is stopped comprises: close the first ventilation section and the second ventilation section after the cooling of the vehicle air conditioner is stopped.

In this way, an implementation in which the existing cold air/warm air duct is reused as a drying duct is provided. This solution in which the evaporator core is placed in closed environment by closing the first ventilation section and the second ventilation section has a lower cost and is easier in control than the provision of a special drying air duct for the evaporator core.

The vehicle air conditioner can usually implement an internal circulation mode and an external circulation mode. The internal circulation is self-circulation of the air in a vehicle cabin, and during the internal circulation, it is required to ensure at least that the first ventilation section in the air duct is in communication with the interior environment. The external circulation means that the air outside the vehicle cabin replaces the air inside the vehicle cabin, and during the external circulation, it is required to ensure that in the air duct, the first ventilation section is in communication with the interior environment, and the second ventilation section is in communication with the exterior environment.

In some feasible implementations of the above method for drying an evaporator of a vehicle air conditioner, the first ventilation section comprises a return air inlet and an air outlet.

In some feasible implementations of the above method for drying an evaporator of a vehicle air conditioner, the second ventilation section comprises a fresh air inlet and a condensed water outlet.

It can be understood that the return air inlet is an air inlet of the air duct during internal circulation, and the air outlet is an air outlet of the air duct. No damper is arranged at a return air inlet of a conventional air conditioner box, with view to reducing the cost and a peculiar smell in the air duct.

In some feasible implementations of the above method for drying an evaporator of a vehicle air conditioner, directly venting the hot and humid air from the air duct to exterior environment comprises: directly venting the hot and humid air from the air duct to the exterior environment by opening the second ventilation section.

The hot and humid air is directly vented from the air duct to the exterior environment by opening the second ventilation section, so that the hot and humid air can be prevented from affecting the interior environment, thereby avoiding lowering the air quality inside the vehicle.

It can be understood that opening the second ventilation section may means opening the fresh air inlet to directly vent the hot and humid air through the fresh air inlet, and the venting process may be implemented by using the difference between the pressures inside and outside the air duct; or vent the hot and humid air through the condensed water outlet, and the venting process may also be implemented by using the difference between the pressures inside and outside the air duct; or venting the hot and humid air through the fresh air inlet and the condensed water outlet, so as to increase the venting efficiency of the hot and humid air. In the above several solution, there is no need to perform excessive improvement on an existing vehicle air conditioner structure.

In some feasible implementations of the above method for drying an evaporator of a vehicle air conditioner, the method further comprises: stopping the operation of the heating core and the fan before the second ventilation section is opened.

Upon that the humidity of the evaporator core is reduced to a preset humidity threshold, the second ventilation section can be opened to vent the hot and humid air in the air duct. The heating core and the fan stops operating before the second ventilation section is opened, and the hot and humid air in the air duct can be vented only by means of the difference between the air pressures inside and outside the air duct and its inertia after the fan stops operating, thereby preventing unnecessary energy consumption.

It can be understood that it is also possible to stop the operation of the heating core and the fan while or after the second ventilation section is opened.

In addition, the operation of the heating core may be stopped in such a way that the heating core and the fan stop operating simultaneously or the heating core stops operating before the fan.

In some feasible implementations of the above method for drying an evaporator of a vehicle air conditioner, the heating core stops operating before the fan.

By stopping the operation of the heating core before the fan, that is, the dissipation of residual heat may be accelerated by means of the fan after the heating core stops continuously heating, which facilitates prolonging the service life of the heating core.

In some feasible implementations of the above method for drying an evaporator of a vehicle air conditioner, the heating core is a PTC heating core and/or a warm air core.

It can be understood that a vehicle configured with no PTC heating core, such as an ordinary fuel vehicle, may raise the air temperature by means of a warm air core; a vehicle configured with no warm air core, such as an electric vehicle, may raise the air temperature by means of a PTC heating core; and a vehicle configured with both a PTC heating core and a warm air core to implement efficient heating may also raise the air temperature by means of the PTC heating core and the warm air core. In addition, the heating core may also be a heating core composed of an ordinary electric heater tube.

According to a second aspect, the disclosure further provides a system for drying an evaporator of a vehicle air conditioner, wherein the vehicle air conditioner comprises an air conditioner box, the evaporator comprises an evaporator core, an air duct for circulating air is constructed in the air conditioner box, and a fan, the evaporator core and a heating core are arranged in the air duct, the system comprising:

a closing module configured to close the air duct after cooling of the vehicle air conditioner is stopped; a drying module configured to operate the heating core and the fan such that hot air capable of circulating is generated in the air duct by means of the heating core and the fan, and during circulation, the hot air carries away condensed water precipitated on a surface of the evaporator core for conversion into hot and humid air; and a moisture discharge module configured to directly vent the hot and humid air from the air duct to exterior environment, so that the evaporator core is dried.

In some feasible implementations of the above system for drying an evaporator of a vehicle air conditioner, the air duct is provided with a ventilation section, the ventilation section comprises a first ventilation section and a second ventilation section, the first ventilation section is capable of being in communication with the interior environment, the second ventilation section is capable of being in communication with the exterior environment, and the closing module is further configured to close the first ventilation section and the second ventilation section after the cooling of the vehicle air conditioner is stopped.

In some feasible implementations of the above system for drying an evaporator of a vehicle air conditioner, the first ventilation section comprises a return air inlet and an air outlet.

In some feasible implementations of the above system for drying an evaporator of a vehicle air conditioner, the second ventilation section comprises a fresh air inlet and a condensed water outlet.

In some feasible implementations of the above system for drying an evaporator of a vehicle air conditioner, the moisture discharge module is further configured to directly vent the hot and humid air from the air duct to the exterior environment by opening the second ventilation section.

In some feasible implementations of the above system for drying an evaporator of a vehicle air conditioner, the system further comprises an intermediate module, which is configured to stop the operation of the heating core and the fan before the second ventilation section is opened.

In some feasible implementations of the above system for drying an evaporator of a vehicle air conditioner, the intermediate module is further configured to cause the heating core to stop operating before the fan.

In some feasible implementations of the above system for drying an evaporator of a vehicle air conditioner, the heating core is a PTC heating core and/or a warm air core.

It can be understood by those skilled in the art that because the above system for drying an evaporator of a vehicle air conditioner can perform the foregoing method for drying an evaporator of a vehicle air conditioner, the system has all the technical effects of the foregoing method. Details will not be described herein again.

According to a third aspect, the disclosure further provides a vehicle, which comprises a memory and a processor, wherein the memory is suitable for storing a plurality of program codes which, when being loaded and executed by the processor, cause the method for drying an evaporator of a vehicle air conditioner according to any one of the foregoing technical solutions to be carried out.

According to a fourth aspect, the disclosure further provides a computer-readable storage medium, which is suitable for storing a plurality of program codes which, when being loaded and executed by the processor, cause the method for drying an evaporator of a vehicle air conditioner according to any one of the foregoing technical solutions to be carried out.

It can be understood by those skilled in the art that because the above vehicle and computer-readable storage medium can perform the method for drying an evaporator of a vehicle air conditioner according to any one of the foregoing technical solutions, the vehicle and the computer-readable storage medium have all the technical effects which can be achieved by means of the foregoing method. Details will not be described herein again.

Item 1. A method for drying an evaporator of a vehicle air conditioner, wherein the vehicle air conditioner comprises an air conditioner box, the evaporator comprises an evaporator core, and an air duct for circulating air is constructed in the air conditioner box, and a fan, the evaporator core and a heating core are arranged in the air duct, the method comprising: closing the air duct after cooling of the vehicle air conditioner is stopped; operating the heating core and the fan such that: hot air capable of circulating is generated in the air duct by means of the heating core and the fan, and during circulation, the hot air carries away condensed water precipitated on a surface of the evaporator core for conversion into hot and humid air; and directly venting the hot and humid air from the air duct to exterior environment, so that the evaporator core is dried.

Item 2. The method for drying an evaporator of a vehicle air conditioner according to item 1, wherein the air duct is provided with a ventilation section, the ventilation section comprises a first ventilation section and a second ventilation section, the first ventilation section is capable of being in communication with interior environment, the second ventilation section is capable of being in communication with the exterior environment, and closing the air duct after cooling of the vehicle air conditioner is stopped comprises: close the first ventilation section and the second ventilation section after the cooling of the vehicle air conditioner is stopped.

Item 3. The method for drying an evaporator of a vehicle air conditioner according to item 2, wherein the first ventilation section comprises a return air inlet and an air outlet.

Item 4. The method for drying an evaporator of a vehicle air conditioner according to item 2 or 3, wherein the second ventilation section comprises a fresh air inlet and a condensed water outlet.

Item 5. The method for drying an evaporator of a vehicle air conditioner according to item 2, wherein directly venting the hot and humid air from the air duct to exterior environment comprises: directly venting the hot and humid air from the air duct to the exterior environment by opening the second ventilation section.

Item 6. The method for drying an evaporator of a vehicle air conditioner according to item 5, wherein the method further comprises: stopping the operation of the heating core and the fan before the second ventilation section is opened.

Item 7. The method for drying an evaporator of a vehicle air conditioner according to item 6, wherein the heating core stops operating before the fan.

Item 8. The method for drying an evaporator of a vehicle air conditioner according to item 7, wherein the heating core is a PTC heating core and/or a warm air core.

Item 9. A system for drying an evaporator of a vehicle air conditioner, wherein the vehicle air conditioner comprises an air conditioner box, the evaporator comprises an evaporator core, an air duct for circulating air is constructed in the air conditioner box, and a fan, the evaporator core and a heating core are arranged in the air duct, the system comprising: a closing module configured to close the air duct after cooling of the vehicle air conditioner is stopped; a drying module configured to operate the heating core and the fan such that hot air capable of circulating is generated in the air duct by means of the heating core and the fan, and during circulation, the hot air carries away condensed water precipitated on a surface of the evaporator core for conversion into hot and humid air; and a moisture discharge module configured to directly vent the hot and humid air from the air duct to exterior environment, so that the evaporator core is dried.

Item 10. The system for drying an evaporator of a vehicle air conditioner according to item 9, wherein the air duct is provided with a ventilation section, the ventilation section comprises a first ventilation section and a second ventilation section, the first ventilation section is capable of being in communication with interior environment, the second ventilation section is capable of being in communication with the exterior environment, and the closing module is further configured to close the first ventilation section and the second ventilation section after the cooling of the vehicle air conditioner is stopped.

Item 11. The system for drying an evaporator of a vehicle air conditioner according to item 10, wherein the first ventilation section comprises a return air inlet and an air outlet.

Item 12. The system for drying an evaporator of a vehicle air conditioner according to item 10 or 11, wherein the second ventilation section comprises a fresh air inlet and a condensed water outlet.

Item 13. The system for drying an evaporator of a vehicle air conditioner according to item 10, wherein the moisture discharge module is further configured to directly vent the hot and humid air from the air duct to the exterior environment by opening the second ventilation section.

Item 14. The system for drying an evaporator of a vehicle air conditioner according to item 13, wherein the system further comprises an intermediate module configured to stop the operation of the heating core and the fan before the second ventilation section is opened.

Item 15. The system for drying an evaporator of a vehicle air conditioner according to item 14, wherein the intermediate module is further configured to cause the heating core to stop operating before the fan.

Item 16. The system for drying an evaporator of a vehicle air conditioner according to item 15, wherein the heating core is a PTC heating core and/or a warm air core.

Item 17. A vehicle, wherein the vehicle comprises a memory and a processor, wherein the memory is suitable for storing a plurality of program codes which, when being loaded and executed by the processor, cause the method for drying an evaporator of a vehicle air conditioner according to any one of items 1 to 7 to be carried out.

Item 18. A computer-readable storage medium, wherein the computer-readable storage medium is suitable for storing a plurality of program codes which, when being loaded and executed by a processor, cause the method for drying an evaporator of a vehicle air conditioner according to any one of items 1 to 7.

BRIEF DESCRIPTION OF THE SEVERAL VIEWS OF THE DRAWINGS

The disclosed content of the disclosure will become more readily understood with reference to the accompanying drawings. Those skilled in the art readily understand that the accompanying drawings are merely for the purpose of illustration, and are not intended to limit the scope of protection of the disclosure. In addition, like numerals are used to designate like elements in the drawings in which.

LIST OF REFERENCE SIGNS

1. Air conditioner box; 10. Box body; 100. Air duct; 1000. Fresh air inlet; 1001. Return air inlet; 1002. Defrosting outlet; 1003. Face blowing outlet; 1004. Foot blowing outlet; 1005. Condensed water outlet; 101. Fresh air damper; 102. Drying damper; 103. Defrosting damper; 104. Face blowing damper; 105. Foot blowing damper; 11. Air filter; 12. Fan; 13. Evaporator core; 14. Warm air core; 15. PTC heating core.

DETAILED DESCRIPTION

Preferred implementations of the disclosure are described below with reference to the accompanying drawings. It should be understood by those skilled in the art that these implementations are only for explaining the technical principles of the disclosure and are not intended to limit the scope of protection of the disclosure.

In addition, to better illustrate the disclosure, numerous specific details are given in the following detailed implementations. It should be understood by those skilled in the art that the disclosure may be implemented without some specific details.

It should be noted that the terms "first" and "second" used herein are merely used for description, but cannot be understood as indicating or implying relative importance.

A vehicle air conditioner provided according to an embodiment of the disclosure comprises a compressor, a condenser, an expansion valve, an evaporator, and a pipeline which sequentially connects these components to provide refrigerant circulation. The evaporator is arranged inside an air conditioner box, and the condenser, the compressor, the expansion valve, etc. are arranged outside the air conditioner box.

Figure 1:
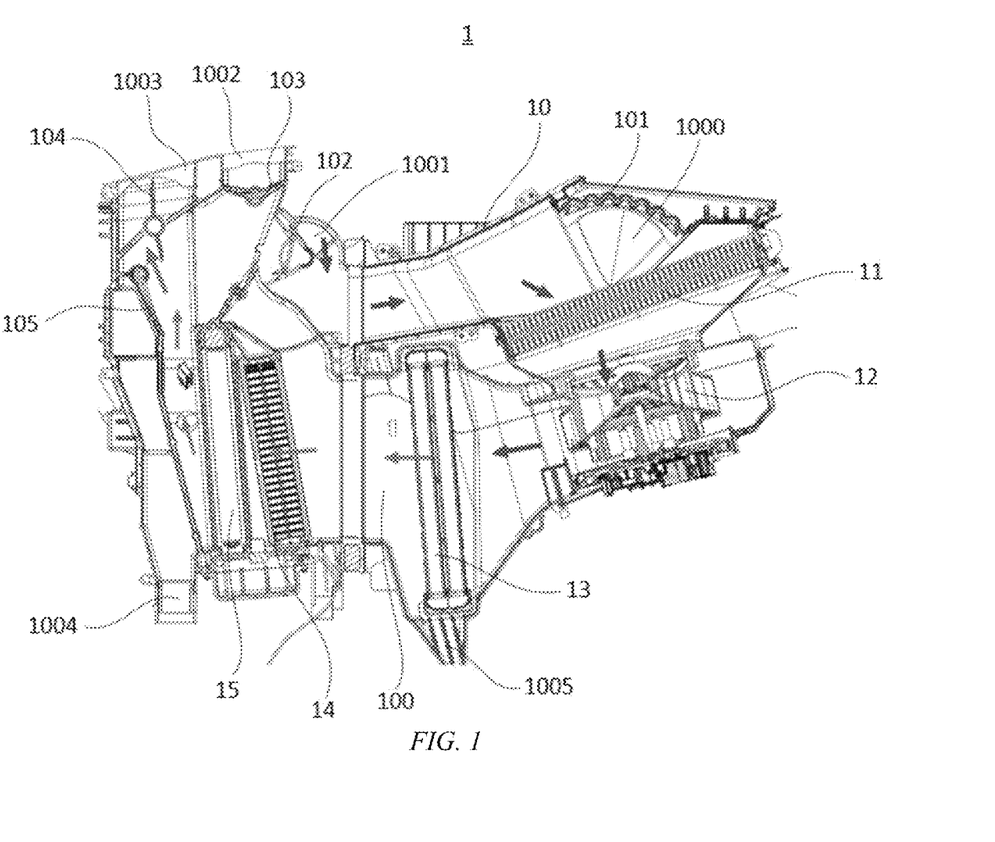
FIG. 1 is a schematic cross-sectional structural diagram of an air conditioner box provided according to an embodiment of the disclosure, showing an air circulation state in an air duct in an internal circulation cooling mode.

FIG. 1 is a schematic cross-sectional structural diagram of an air conditioner box provided according to an embodiment of the disclosure, showing an air circulation state in an air duct in an internal circulation cooling mode.

As shown in FIG. 1, an air duct 100 is constructed in a box body 10 of an air conditioner box 1. When viewed clockwise, an air filter 11, a fan 12, an evaporator core 13, a warm air core 14, and a PTC heating core 15 are sequentially arranged in the air duct 100 of the air conditioner box 1. The air filter 11 is configured to filter out impurities in the air flowing through the air duct 100 for purifying the air. The fan 12 is configured to facilitate air circulation in the air duct 100. The evaporator core 13 is configured to provide, during cooling of the vehicle air conditioner, cold to the air circulating in the air duct 100. The PTC heating core 15 and the warm air core 14 are configured to provide, during heating of the vehicle air conditioner, heat to the air circulating in the air duct 100. The PTC heating core 15 is formed by combining several single pieces of ceramic in parallel and then cementing the pieces of ceramic and corrugated aluminum strips at a high temperature, and has the advantages of low thermal resistance, high heat exchange efficiency, and low power attenuation in long-term use. In addition, compared with electrical heating, the PTC heating core further has the advantage of high safety performance. That is, when the fan 12 stops operating, the power of the PTC heating core will be automatically reduced sharply due to insufficient heat dissipation, so that the surface temperature of the PTC heating core will be kept at a set value without the phenomenon of "redness" occurring to a surface of an electric heater tube. The PTC heating core 15 is configured to assist in heating in a fuel vehicle.

Still referring to FIG. 1, the air duct 100 is provided with a first ventilation section which can be in communication with interior environment and a second ventilation section which can be in communication with exterior environment.

Specifically, the first ventilation section comprises a return air inlet 1001 and an air outlet, wherein the air outlet comprises a defrosting outlet 1002, a face blowing outlet 1003, and a foot blowing outlet 1004. Outlet air at the defrosting outlet 1002 faces a front windshield and vehicle door glass on two sides, outlet air at the face blowing outlet 1003 faces a body of a passenger, and outlet air at the foot blowing outlet 1004 faces the positions of the feet of the passenger. The face blowing outlet 1003 is usually further provided with an air guide member through which the direction and volume of the air from the face blowing outlet 1003 can be adjusted. In addition, the air duct 100 is internally further provided with a defrosting damper 103, a face blowing damper 104, and a foot blowing damper 105, which are configured to respectively control the opening and closing of the defrosting outlet 1002, the face blowing outlet 1003, and the foot blowing outlet 1004.

In this embodiment, the second ventilation section comprises a fresh air inlet 1000 and a condensed water outlet 1005. A fresh air damper 101 is arranged at the fresh air inlet 1000, and the opening and closing of the fresh air inlet 1000 are controlled by the fresh air damper 101. The condensed water outlet 1005 is arranged below the evaporator core 13. A condensed water pipe is connected to the condensed water outlet 1005, and the condensed water pipe controls the opening and closing of the pipeline by means of a valve provided therein.

The above vehicle air conditioner can implement two circulation modes: an internal circulation mode and an external circulation mode. The circulation mode used is usually determined by a user based on the air quality (such as PM 2.5, temperature, and humidity) of the exterior environment and the user's own needs. No matter which circulation mode is used, at least one of the air outlets in communication with the interior environment needs to be in an open state.

When the vehicle air conditioner is in the internal circulation mode, the return air inlet 1001 is in an open state, and the fresh air inlet 1000 is in a closed state. Specifically, in an example in which an internal circulation cooling mode is activated in summer, when the vehicle air conditioner operates in the cooling mode, the drying damper 102 is in an open state, the fresh air damper 101 and the defrosting damper 103 are in a closed state, and a condensed water pipeline is in a connected state. During cooling, it is usually preferred to open the face blowing damper 104 and close the foot blowing damper 105, which can make the user feel more comfortable and is conducive to energy saving. An air circulation path is shown in FIG. 1. When the compressor and the fan 12 are activated, the fan 12 makes the air in the air duct 100 circulate clockwise, to create a negative pressure at the return air inlet 1001, thereby forcing the air in a vehicle cabin into the air duct 100. The air in the air duct 100 is filtered by the air filter 11 before passing through the evaporator core 13, and exchanges heat with a low-temperature refrigerant in the evaporator core 13 for conversion into cold air. The cold air is conveyed by a section of the air duct 100 in a lower portion of the air conditioner box 1 and then enters the vehicle cabin through the face blowing outlet 1003, thereby implementing the internal circulation of the air.

When the vehicle air conditioner is in the external circulation mode, the fresh air inlet 1000 is in an open state, and the return air inlet 1001 may be in a closed state or in an open state. This is because the fresh air inlet 1000 is relatively far away from the return air inlet 1001, and the fresh air inlet 1000 is adjacent to the fan 12. In the open state of the fresh air inlet 1000, the fan 12 has little impact on a pressure at the return air inlet 1001, so that there is no need to further close the return air inlet 1001, and therefore an existing vehicle air conditioner is usually not provided with a damper for the return air inlet 1001.

In an example in which an external circulation heating mode is activated in winter, the fresh air damper 101 is in an open state, the drying damper 102 is in a closed state, and the condensed water pipeline is in a connected state. During heating, it is usually preferred to open the foot blowing damper 105 and close the face blowing damper 104. When the fan 12 is started, the fan 12 forces the air in the air duct 100 to circulate clockwise to create a negative pressure at the fresh air inlet 1000. Because the fan 12 is started to force the air outside the vehicle cabin enter the air duct 100 through the fresh air inlet 1000, the air in the air duct 100 is filtered by the air filter 11 and then passes through the warm air core 14 and/or the PTC heating core 15, the warm air core 14 and/or the PTC heating core 15 release(s) heat to heat the air in the air duct 100, and the air is converted into warm air and then is blown out through the foot blowing outlet 1004. When glass needs to be defrosted, the defrosting outlet 1002 can be opened at the same time, and some hot air is blown out through the defrosting outlet 1002.

It can be understood that although the internal circulation mode allows the temperature of the air in the vehicle cabin to reach a target temperature rapidly, prolonged internal circulation will reduce the oxygen concentration and increase the carbon dioxide concentration in the vehicle cabin. Therefore, the vehicle air conditioner needs to switch between the internal circulation mode and the external circulation mode during operation in both summer and winter, so as to ensure the freshness of the air in the vehicle.

After the cooling of the vehicle air conditioner is finished, there will be water residue on the surface of the evaporator core 13. Based on the above vehicle air conditioner structure, the disclosure provides a method for an evaporator of a vehicle air conditioner, which can implement rapid drying of the evaporator, with relatively low energy consumption during drying.

Embodiment 1

Figure 2:
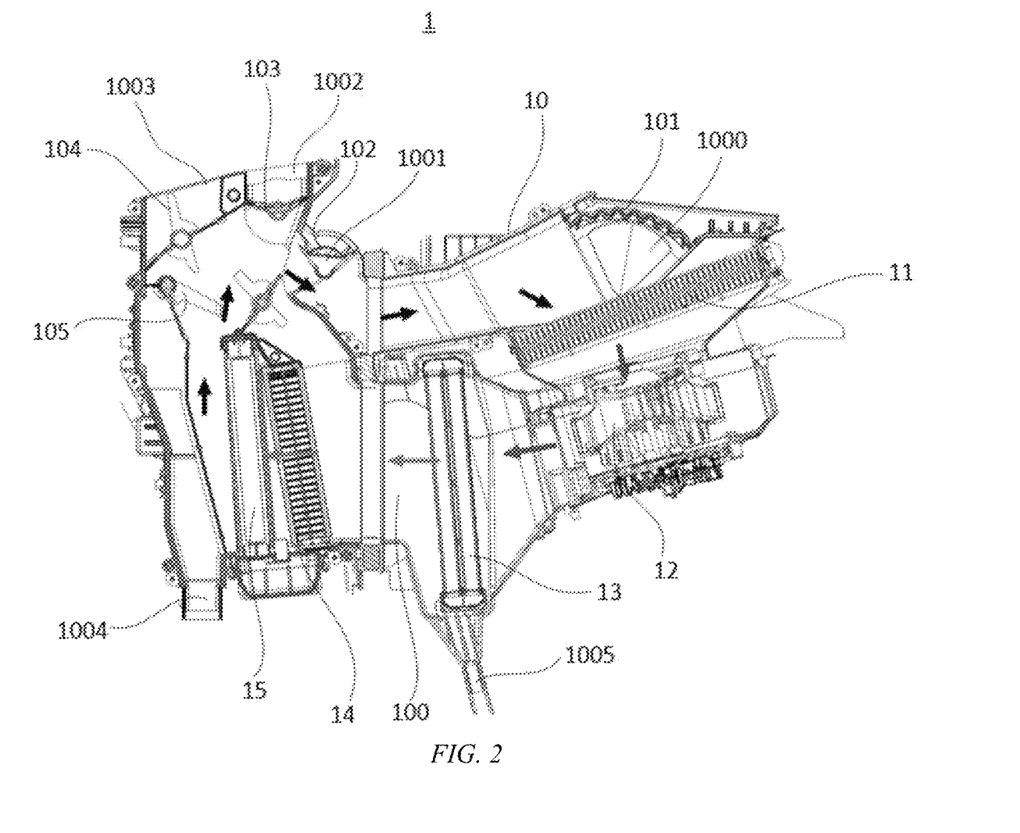
FIG. 2 is a schematic cross-sectional structural diagram of an air conditioner box provided according to an embodiment of the disclosure, showing an air circulation state in an air duct during drying of an evaporator core.
Figure 3:
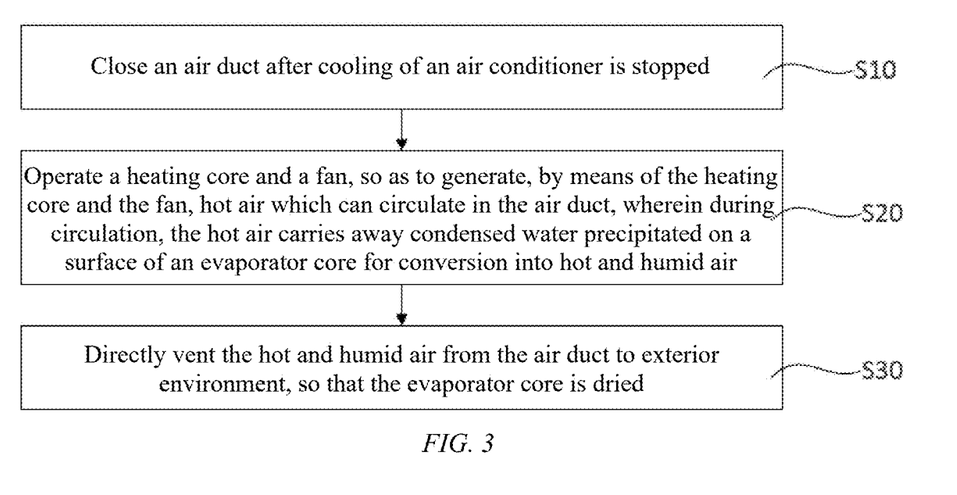
FIG. 3 is a flow block diagram of a method provided according to an embodiment of the disclosure.

As shown in FIGS. 2 and 3, a method for drying an evaporator of a vehicle air conditioner provided according to the embodiment of the disclosure comprises the following steps.

In step S10, an air duct is closed after cooling of the vehicle air conditioner is stopped.

Specifically, in an example of internal circulation cooling, during cooling of the vehicle air conditioner, a drying damper and a face blowing damper are in an open state, a fresh air damper, a defrosting damper and a foot blowing damper are in a closed state, and a condensed water pipeline is in a connected state. The air in the air duct is converted into cold air under the action of the evaporator and enters a vehicle cabin, so that the temperature in the vehicle cabin is reduced.

In the method provided according to the embodiment of the disclosure, the air duct is closed after the cooling of the vehicle air conditioner is stopped, so as to build closed environment for a drying process. Specifically, the drying damper, the fresh air damper, the face blowing damper, the foot blowing damper and the defrosting damper are controlled to be in the closed state, and a condensed water outlet is closed. During closing each damper, a logic for determining an open/closed state may be added to the control of each damper. When it is determined that the damper is in the closed state, the original state is maintained; and when it is determined that the damper is in the open state, the damper is controlled to be closed.

In step S20, a heating core and a fan are operated, so as to generate, by means of the heating core and the fan, hot air which can circulate in the air duct, and during circulation, the hot air carries away condensed water precipitated on a surface of an evaporator core for conversion into hot and humid air.

Specifically, after each damper is controlled so that the air duct is closed, the heating core and the fan may be operated simultaneously, or the fan may be operated before the heating core. The heating core in this embodiment is a PTC heating core, and the fan operates before the PTC heating core. After the fan and PTC heating core operate, PTC heating core continuously transfers heat to the air in the air duct, and the air temperature rises rapidly and the air becomes circulating hot air. An air circulation state is shown in FIG. 2. A high-temperature airflow circulates and passes by the surface of the evaporator core, thereby accelerating the evaporation of water, creating environment similar to a steamer for the evaporator, and evaporating the water on the surface of the evaporator core. In the process, the hot air carries away the condensed water precipitated on the surface of the evaporator core for conversion into hot and humid air.

During the drying, because the air duct is closed, a loss of heat emitted by the PTC heating core is relatively small, and most of the heat is used to raise the air temperature. Compared with an existing solution in which the air duct is in an open state during drying, the solution according to the disclosure greatly improves heat energy utilization.

In step S30, the hot and humid air is directly vented from the air duct to exterior environment to dry the evaporator core.

When the humidity on the surface of the evaporator core reaches a preset humidity threshold, it indicates that a drying stage of the evaporator core has been completed, and it is required to further enter a moisture discharge stage to discharge the generated hot and humid air. Because the air duct is in a closed state in the drying stage, the pressure in the air duct will rise during conversion of the internal air into the hot and humid air, and then there will be a difference between pressures inside and outside the air duct after the drying stage is completed. In this embodiment, the pressure difference is used to implement the automatic discharge of the hot and humid air, which can further reduce energy consumption during the drying.

Specifically, the following steps are performed.

In step S300, the operation of the heating core and the fan is stopped.

After the water is evaporated, the energy consumption of a system can be reduced by stopping the operation of the heating core. Because the difference between the pressures inside and outside the air duct can be used to facilitate the discharge of the hot and humid air, stopping the operation of the fan can further reduce the energy consumption of the system. To protect the PTC heating core, the PTC heating core stops operating before the fan.

In step S301, the hot and humid air is directly vented from the air duct to the exterior environment by opening the second ventilation section.

In the disclosure, the second ventilation section comprises a plurality of vents, and the second ventilation section is in an open state as long as one of the vents is in an open state.

Specifically, in this embodiment, the process of directly discharging the hot and humid air in the air duct by opening the second ventilation section consists in that the condensed water outlet is opened after the fan stops operating, and the difference between the pressures inside and outside the air duct is used to spontaneously discharge the hot and humid air at a high pressure side to the exterior environment at a low pressure side via the condensed water outlet and the condensed water pipe connected to the condensed water outlet, which in turn vents the hot and humid air through the condensed water outlet.

In this way, the rapid drying of the evaporator core is achieved, and the drying process take a short time and has low energy consumption and high efficiency.

It should be noted that "stopping the operation of the fan" means that a motor for driving an air fan in the fan is powered off. After the motor is powered off, the air fan may still rotate due to inertia, so the air fan may still be in a rotating state after the fan stops operating. Therefore, the venting of the hot and humid air may be accelerated by means of the inertia rotation of the air fan.

Embodiment 2

An example in which a vehicle air conditioner performs external circulation cooling is taken in this embodiment for description.

A method for drying an evaporator of a vehicle air conditioner provided according to this embodiment comprises the following steps.

In step T10, an air duct is closed after cooling of the vehicle air conditioner is stopped.

Specifically, during cooling of the vehicle air conditioner, a fresh air damper, a drying damper and a face blowing damper are in an open state, a defrosting damper and a foot blowing damper are in a closed state, and a condensed water pipeline is in a connected state. After the cooling of the vehicle air conditioner is stopped, the drying damper, the fresh air damper, the face blowing damper, the foot blowing damper and the defrosting damper are controlled to be in the closed state, and a condensed water outlet is closed. Similar to step S10, it can be ensured that each damper is in a closed state by means of an opening/close determining logic.

In step T20, a heating core and a fan are operated, so as to generate, by means of the heating core and the fan, hot air which can circulate in the air duct, and during circulation, the hot air carries away condensed water precipitated on a surface of an evaporator core for conversion into hot and humid air.

Specifically, for this step, reference may be made to step S20 in Embodiment 1.

In step T30, the hot and humid air is directly vented from the air duct to exterior environment, so that the evaporator core is dried.

Similar to step S30 in Embodiment 1, in this embodiment, a difference between pressures inside and outside the air duct is also used to vent the hot and humid air. This embodiment differs from Embodiment 1 in that the hot and humid air is vented through a fresh air inlet.

Specifically, the following steps are performed.

In step T300, the operations of the heating core and the fan is stopped.

For this step, reference may be made to step S300 in Embodiment 1.

In step T301, the hot and humid air is directly vented from the air duct to the exterior environment by opening the second ventilation section.

Specifically, in this embodiment, the process of venting the hot and humid air in the air duct by opening the second ventilation section consists in that the fresh air damper is opened after the fan stops operating, and the difference between the pressures inside and outside the air duct is used to spontaneously and directly discharge the hot and humid air at a high pressure side to the exterior environment at a low pressure side through the fresh air inlet, thereby implementing smooth venting of the hot and humid air.

It can be understood that it is also possible to open the fresh air damper and the condensed water outlet at the same time to accelerate the discharge of the hot and humid air.

After the discharge of the hot and humid air is completed, the fresh air damper and the condensed water outlet return to the closed state, while the drying damper returns to the open state.

It should be noted that the method according to the disclosure is applicable for both electric vehicles and fuel vehicles.

In addition, an embodiment of the disclosure further provides a system for drying an evaporator of a vehicle air conditioner. The system for drying an evaporator of a vehicle air conditioner corresponds to the method in the foregoing embodiment. The system comprises a closing module, a drying module, and a moisture discharge module.

Specifically, the closing module is configured to close the air duct after cooling of the vehicle air conditioner is stopped. The air duct is provided with a ventilation section, the ventilation section comprises a first ventilation section and a second ventilation section, the first ventilation section can be in communication with interior environment, and the second ventilation section can be in communication with exterior environment. The first ventilation section comprises a return air inlet and an air outlet, wherein the air outlet comprises a face blowing outlet, a foot blowing outlet, and a defrosting outlet. The second ventilation section comprises a fresh air inlet and a condensed water outlet. The closing module is further configured to: close the first ventilation section and the second ventilation section after the cooling of the vehicle air conditioner is stopped, i.e., closing the return air inlet, the face blowing outlet, the foot blowing outlet, the defrosting outlet, the fresh air inlet and the condensed water outlet after the cooling of the vehicle air conditioner is finished. For specific closing determining logic, reference may be made to the above embodiment.

The drying module is configured to operate a heating core and a fan, so as to generate, by means of the heating core and the fan, hot air which can circulate in the air duct, and during circulation, the hot air carries away condensed water precipitated on a surface of an evaporator core for conversion into hot and humid air. The heating core is a PTC heating core and/or a warm air core. It can be understood that it is preferred to operate the fan before the heating core.

The moisture discharge module is configured to directly vent the hot and humid air from the air duct to the exterior environment so that the evaporator core is dried. Specifically, the moisture discharge module is configured to directly vent the hot and humid air from the air duct to the exterior environment by opening the second ventilation section.

In order to further reduce the energy consumption of the system, the system is further provided with an intermediate module, which is configured to stop the operation of the heating core and the fan before the second ventilation section is opened. More specifically, the intermediate module is configured to cause the heating core to stop operating before the fan.

Under the control of a controller, the closing module, the drying module and the moisture discharge module act in coordination, so that the evaporator core can be rapidly dried. In addition, an embodiment of the disclosure further provides a vehicle, which comprises a memory and a processor, wherein the memory is suitable for storing a plurality of program codes which, when being loaded and executed by the processor, cause the method for drying an evaporator of a vehicle air conditioner in the foregoing embodiment to be carried out.

An embodiment of the disclosure further provides a computer-readable storage medium. The computer-readable storage medium stores a computer program which, when being executed by a processor, causes the method for drying an evaporator of a vehicle air conditioner in the foregoing embodiment to be implemented.

In the description of the disclosure, the "module" and the "processor" may comprise hardware, software, or a combination of the hardware and the software. A module may include a hardware circuit, various suitable sensors, a communication port, and a memory, or may include a software part, for example, program code, or may be a combination of software and hardware. The processor may be a central processing unit, a microprocessor, a graphics processing unit, a digital signal processor, or any other suitable processor. The processor has a data and/or signal processing function. The processor may be implemented in a form of software or hardware, or in a form of a combination of the software and the hardware. A non-transitory computer-readable storage medium includes any suitable medium that can store program code, for example, a magnetic disk, a hard disk, an optical disc, a flash memory, a read-only memory, or a random access memory.

It can be understood by those skilled in the art that, in the disclosure, all or a part of the processes in the methods in the above embodiments may also be implemented by a computer program instructing related hardware. The computer program may be stored in a computer-readable storage medium. When being executed by a processor, the computer program may implement steps in the above method embodiments. The computer program includes computer program code, which may be in a source code form, an object code form, an executable file form, some intermediate forms, or the like. The computer-readable medium may include: any entity or device that can carry the computer program code, a medium, a USB flash drive, a removable hard disk, a magnetic disk, a compact disc, a computer memory, a read-only memory, a random access memory, an electrical carrier signal, a telecommunications signal, and a software distribution medium, etc. It should be noted that the content included in the computer-readable storage medium can be appropriately added or deleted depending on requirements of the legislation and patent practice in a jurisdiction. For example, in some jurisdictions, according to the legislation and patent practice, the computer-readable storage medium does not include an electrical carrier signal and a telecommunications signal.

Further, it should be understood that, since the configuration of the modules is merely intended to illustrate functional units of the system according to the disclosure, a physical device corresponding to the modules may be a processor itself, or part of software or part of hardware in the processor, or part of a combination of the software and the hardware. Therefore, the number of modules may be configured as required.

Those skilled in the art can understand that the modules may be adaptively separated. The specific separation of the modules does not cause the technical solutions to depart from the principle of the disclosure, so that all the technical solutions after separation fall within the scope of protection of the disclosure.

Heretofore, the technical solutions of the disclosure have been described with reference to the preferred implementations shown in the accompanying drawings. However, those skilled in the art can readily understand that the scope of protection of the disclosure is apparently not limited to these specific implementations. Those skilled in the art can make equivalent changes or replacements to the related technical features without departing from the principles of the disclosure, and all the technical solutions after the changes or the replacements fall within the scope of protection of the disclosure.

The invention claimed is:

1. A method for drying an evaporator of a vehicle air conditioner, wherein the vehicle air conditioner comprises an air conditioner box, the evaporator comprises an evaporator core, and an air duct for circulating air is constructed in the air conditioner box, and a fan, the evaporator core and a heating core are arranged in the air duct, the method comprising:
   closing the air duct after cooling of the vehicle air conditioner is stopped;
   operating the heating core and the fan such that:
     hot air capable of circulating is generated in the air duct by means of the heating core and the fan, and during circulation, the hot air carries away condensed water precipitated on a surface of the evaporator core for conversion into hot and humid air; and
   directly venting the hot and humid air from the air duct to an exterior environment, so that the evaporator core is dried,
   wherein the air duct is provided with a ventilation section that comprises a first ventilation section and a second ventilation section, wherein the first ventilation section is capable of being in communication with an interior environment, wherein the second ventilation section is capable of being in communication with the exterior environment, and wherein closing the air duct after cooling of the vehicle air conditioner is stopped comprises:
     closing the first ventilation section and the second ventilation section after the cooling of the vehicle air conditioner is stopped,
   wherein the first ventilation section comprises a return air inlet and an air outlet.

2. The method for drying the evaporator of the vehicle air conditioner according to claim 1, wherein the second ventilation section comprises a fresh air inlet and a condensed water outlet.

3. The method for drying the evaporator of the vehicle air conditioner according to claim 1, wherein directly venting the hot and humid air from the air duct to the exterior environment comprises:
   directly venting the hot and humid air from the air duct to the exterior environment by opening the second ventilation section.

4. The method for drying the evaporator of the vehicle air conditioner according to claim 3, wherein the method further comprises:
   stopping the operation of the heating core and the fan before the second ventilation section is opened.

5. The method for drying the evaporator of the vehicle air conditioner according to claim 4, wherein the heating core stops operating before the fan.

6. The method for drying the evaporator of the vehicle air conditioner according to claim 5, wherein the heating core is a PTC heating core or a warm air core.

7. A vehicle comprising a memory and a processor, wherein the memory is suitable for storing a plurality of program codes which, when being loaded and executed by the processor, cause the method for drying the evaporator of the vehicle air conditioner according to claim 1 to be carried out.

8. A system for drying an evaporator of a vehicle air conditioner, wherein the vehicle air conditioner comprises an air conditioner box, the evaporator comprises an evaporator core, an air duct for circulating air is constructed in the air conditioner box, and a fan, the evaporator core and a heating core are arranged in the air duct, the system comprising:
   a processor; and
   memory including computer program code, that when executed by the processor, causes the processor to:
     close the air duct after cooling of the vehicle air conditioner is stopped;
     operate the heating core and the fan such that hot air capable of circulating is generated in the air duct by means of the heating core and the fan, and during circulation, the hot air carries away condensed water precipitated on a surface of the evaporator core for conversion into hot and humid air; and
     directly vent the hot and humid air from the air duct to an exterior environment, so that the evaporator core is dried,
   wherein the air duct is provided with a ventilation section that comprises a first ventilation section and a second ventilation section, wherein the first ventilation section is capable of being in communication with an interior environment, wherein the second ventilation section is capable of being in communication with the exterior environment, and wherein the memory includes computer program code that, when executed by the processor, causes the processor to:
close the first ventilation section and the second ventilation section after the cooling of the vehicle air conditioner is stopped,
wherein the first ventilation section comprises a return air inlet and an air outlet.

9. The system for drying the evaporator of the vehicle air conditioner according to claim 8, wherein the second ventilation section comprises a fresh air inlet and a condensed water outlet.

10. The system for drying the evaporator of the vehicle air conditioner according to claim 8, wherein the memory includes computer program code that, when executed by the processor, causes the processor to directly vent the hot and humid air from the air duct to the exterior environment by opening the second ventilation section.

11. A system for drying an evaporator of a vehicle air conditioner, wherein the vehicle air conditioner comprises an air conditioner box, the evaporator comprises an evaporator core, an air duct for circulating air is constructed in the air conditioner box, and a fan, the evaporator core and a heating core are arranged in the air duct, the system comprising:
a processor; and
memory including computer program code, that when executed by the processor, causes the processor to:
close the air duct after cooling of the vehicle air conditioner is stopped;
operate the heating core and the fan such that hot air capable of circulating is generated in the air duct by means of the heating core and the fan, and during circulation, the hot air carries away condensed water precipitated on a surface of the evaporator core for conversion into hot and humid air; and
a directly vent the hot and humid air from the air duct to exterior environment, so that the evaporator core is dried,
wherein the air duct is provided with a ventilation section that comprises a first ventilation section and a second ventilation section, wherein the first ventilation section is capable of being in communication with an interior environment, wherein the second ventilation section is capable of being in communication with the exterior environment, and wherein the memory includes computer program code that, when executed by the processor, causes the processor to:
close the first ventilation section and the second ventilation section after the cooling of the vehicle air conditioner is stopped;
directly vent the hot and humid air from the air duct to the exterior environment by opening the second ventilation section; and
stop the operation of the heating core and the fan before the second ventilation section is opened.

12. The system for drying the evaporator of the vehicle air conditioner according to claim 11, wherein the memory includes computer program code that, when executed by the processor, causes the processor to cause the heating core to stop operating before the fan.

13. The system for drying the evaporator of the vehicle air conditioner according to claim 12, wherein the heating core is a PTC heating core or a warm air core.

\* \* \* \* \*